United States Patent Office 3,080,338
Patented Mar. 5, 1963

3,080,338
DIENE RUBBERS STABILIZED WITH ORGANIC PHOSPHITES AND PHENOLS
Walter Nudenberg, Caldwell, and Dudley B. Merrifield, Baskin Ridge, N.J., assignors to Texas-U.S. Chemical Company, New York, N.Y., a corporation of Delaware
No Drawing. Filed June 15, 1960, Ser. No. 37,020
8 Claims. (Cl. 260—45.7)

This invention pertains to the protection of synthetic rubbery polymers against deterioration, especially during drying, storage and processing of the polymer, and more particularly it relates to the protection of synthetic rubbery polymers against breakdown and discoloration, by means of an aryl phosphite type stabilizer for rubber in combination with a phenolic type antioxidant for rubber.

The synthetic polymers to which the invention applies are conventional rubbery polymers of conjugated 1,3-dienes, including homopolymers such as polybutadiene and polyisoprene and copolymers such as copolymers of butadiene with up to 50% by weight of a copolymerizable monomer such as styrene, acrylonitrile, vinylpyridine, or the like. If desired the polymer may contain a small amount (e.g. 0.1–5% by weight) of a cross-linking monomer such as divinylbenzene. The polymer may be of the oil-extended type, if desired. The preferred synthetic rubbery polymer employed in the invention is the styrene-butadiene copolymer rubber hereinafter referred to as SBR.

Present day industrial practice in the production of the SBR type synthetic rubbers includes the addition of a stabilizer to protect the raw polymers from deterioration during drying, storage and processing. Thus, organic phosphite type stabilizers, especially aryl phosphite, are used by some SBR manufacturers for the protection of the polymer. Although these aryl phosphite stabilizers are able to protect the polymer itself from breakdown during drying and during limited periods of storage they are not effective in eliminating other problems when the polymer is exposed to air, light and extended heating, or stored for prolonged periods of time. For instance, it is sometimes observed in practice that dark, purple-colored spots or areas will occur in bales of SBR stabilized with aryl phosphite, especially at points where air has become included in the bale, after an extended period of storage. This is a serious problem because the use of a light colored polymer is important in many applications. The polymer for use in shoe soles, floor tiles and light colored mechanical goods must be light colored and remain so during processing. Furthermore, when use is made of SBR to prepare the material known as high impact polystyrene, of the kind made by mixing polystyrene with SBR or by polymerizing styrene on SBR, the SBR is subjected to high temperatures for a considerable period of time and tends to suffer discoloration and degradation. Therefore, protection of SBR intended to be used for this purpose is a particularly difficult problem. The organic phosphite type of stabilizer is unable to effectively stabilize polymers against degradation and/or discoloration under such severe conditions.

It is also conventional practice to use certain phenolic materials as non-discoloring antioxidants to protect SBR against deterioration. Unfortunately, the use of phenolic type antioxidants does not in itself provide the desired degree of protection of the polymer, especially against deterioration arising from prolonged exposure to air, light and/or heat.

We have now found, most unexpectedly, that synthetic rubbery polymers of the kind described above can be protected against deterioration with remarkable effectiveness by employing, in combination, an aryl phosphite type stabilizer and a phenolic type antioxidant material. The protection thus afforded to SBR and similar polymers, against resinification and discoloration, even after relatively long periods of storage and extended exposure to light and/or high temperatures, appears to be a new synergistic effect which would not have been expected from the previously known effects of the phosphite stabilizer alone, or the previously known effects of the phenolic antioxidant alone. The benefits of the invention are most apparent upon subjecting the polymer, containing in combination the phosphite stabilizer and phenolic antioxidant, to extended heat aging, whereupon it is observed that the protection afforded by the combination of phosphite stabilizer and phenolic antioxidant is excellent, whereas the phosphite stabilizer alone or the phenolic antioxidant alone are quite unsatisfactory under the same conditions.

The invention is further based upon the surprising and unexpected finding that for optimum results, the quantity of the phenolic antioxidant employed in combination with the aryl phosphite stabilizer must be carefully limited, that is, the amount of phenolic antioxidant is limited to about 0.0163 part to 0.19 part by weight, per part of aryl phosphite stabilizer. Substantially larger proportions of phenolic antioxidant do not provide the desired degree of protection against discoloration. In general, it may be stated that the sum of the aryl phosphite stabilizer and phenolic antioxidant employed in the invention will amount to from about 0.5 part to 4 parts by weight per 100 parts by weight of the rubbery polymer (or 100 parts of polymer plus oil in the case of oil-extended rubber). The preferred practice involves employing about 1.25 parts of aryl phopshite plus phenolic antioxidant, made up of a mixture ranging from as little as 0.02 part of phenolic antioxidant along with 1.23 parts of aryl phosphite, to as much as 0.2 part of phenolic antioxidant along with 1.05 parts of aryl phosphite. A particularly preferred practice involves the use of about 1.10 parts of aryl phosphite stabilizer along with 0.15 part of phenolic antioxidant, to make a total of 1.25 parts of the combined materials in 100 parts by weight of the rubber. Frequently we use from about 0.8 to 2.0 parts of aryl phosphite stabilizer, along with, correspondingly, from about 0.015 to 0.025 part of phenolic antioxidant.

In practicing the invention, we may employ any conventional phosphite type stabilizer for rubbers, especially the aryl phosphites (in which category we include alkyl-aryl phosphites), such as those disclosed for example in U.S. Patents 2,419,354, issued to Howland on April 22, 1947; 2,732,365, issued to Bill et al. on January 24, 1956, and 2,733,226, issued to Hunter on January 31, 1956. Thus, preferred phosphite stabilizers include triphenyl phosphite, triortho-tolyl phosphite, trixenyl phosphite, tri(paraphenoxy phenyl) phosphite, tri(para-chloro phenyl) phosphite, and similar phosphites listed in 2,419,354, as well as tri(ortho-octyl-phenyl) phosphite, tri(para-undecyl-phenyl) phosphite, para-nonyl-phenyl di(para-octyl-phenyl) phosphite, and similar phosphites listed in 2,733,226, as well as mono(ortho-secondary amyl phenyl) phosphite, mono(nonyl-phenyl) phosphite, and similar chemicals disclosed in 2,732,365.

The phenolic antioxidant employed in combination with the aryl phosphite in accordance with the invention may similarly be any conventional phenolic type rubber antioxidant, such as any or all of those disclosed in U.S. Patents 2,581,906, issued to Smith on January 8, 1952; 2,731,442, issued to Forman on January 17, 1956; 2,538,355, issued to Davis et al. on January 16, 1951;

and 2,202,877, issued to Stevens et al. on June 4, 1940, and also those disclosed in an article by Davis appearing in Rubber Age, August 1955, page 708, as well as any other conventional phenolic type antioxidants disclosed in the prior art. Attention is also directed to U.S. Patents 2,224,837, issued to Rosenthal et al. on December 10, 1950; 2,329,671, issued to Ward et al. on September 14, 1943, and 2,670,340, issued to Kehe on February 23, 1954, as disclosing various conventional phenolic antioxidants which may be employed in the invention. Among the typical suitable conventional phenolic antioxidants may be mentioned aryl-substituted phenols such as para-phenylphenol ("Parazone") and aralkyl substituted phenols such as the styrenated phenols ("Wing-Stay S," "Agerite Spar"); the alkylene bis(polyalkyl phenols) such as 2,2'-methylene bis (4-ethyl-6-tertiarybutyl phenol) ("Antioxidant 425"); 2,2'-methylene bis(4-methyl-6-tertiarybutylphenol) ("Antioxidant 2246"); or 4,4-butylidene bis(3-methyl-6-tertiarybutylphenol) ("Santowhite Powder"), as well as corresponding sulfides of bis phenols such as 4,4'-thio bis(3-methyl-6-tertiarybutylphenol) ("Santowhite Crystals") and 2,2'-thio bis (4-methyl-6-tertiarybutylphenol) ("CAO6"), as well as polyalkyl phenols such as 2,6-ditertiarybutyl-4-methyl phenol ("Deenax"; "Agerite Superlite") or nonylated alkyl phenols (reaction product of p-cresol and propylene trimer—"Wing-Stay T"); and aryl ethers of hydroquinone such as the monobenzyl ether of hydroquinone ("Agerite Alba").

The phosphite stabilizer may be added to the polymer in accordance with conventional practice, preferably prior to the drying of the polymer in order that the polymer may be adequately stabilized and protected during the drying and subsequent storage and processing operations. In accordance with a preferred practice the phosphite stabilizer may be added to the latex in which the polymer is usually prepared in the conventional manner so that the stabilizer becomes intimately mixed with the polymer in the latex form and the polymer is subsequently coagulated with the stabilizer contained therein. Alternatively the phosphite stabilizer may be mixed into the polymer subsequent to coagulation.

Similarly, the phenolic antioxidant may be added at any suitable stage, such as by incorporating in the latex either in admixture with the phosphite stabilizer, or as a separate ingredient. Alternatively, the phenolic antioxidant may be incorporated in the polymer after coagulation, for example by milling into the polymer, before or after drying.

In the case of oil extended polymer, it is frequently convenient to add the phosphite stabilizer and/or the phenolic antioxidant to the oil, which is then combined with the rubber. A preferred practice is to add the oil as such, or in the form of an emulsion, to the rubber in the form of latex.

The composition of the invention, comprising the polymer containing the phosphite stabilizer and phenolic antioxidant, may be compounded further with the usual conventional compounding ingredients, such as vulcanizing agents, accelerators, and the like. If desired, additional quantities of any suitable conventional antioxidants may be added to the final composition to protect the final article against deterioration in use, but it will generally be found that such additional antioxidant is unnecessary, because the composition of the invention is already protected against oxidative attack in use.

Our invention provides for positive protection of the SBR or similar rubber from color generation and resinification during various stages of manufacture of the polymer, including drying, as well as during subsequent shipment and extended storage, and during any additional processing that the polymer may be subjected to, especially processing involving exposure to elevated temperatures, as in the use of SBR to make high impact polystyrene. The polymer of the invention protected by the aryl phosphite stabilizer in combination with the phenolic antioxidant, is highly resistant to oxidative discoloration and to discoloration initiated by ultra violet light. A further advantage of the polymer protected in accordance with the invention is that the tendency of the polymer to catch fire while being dried at high temperature is greatly reduced.

It is desired to emphasize that the protection of the polymer, containing both the aryl phosphite stabilizer and the phenolic antioxidant, is greatly in excess of anything that could be expected or predicted simply from the known individual effects of the aryl phosphite stabilizer when used alone, or of the phenolic antioxidant when used alone. The surprising synergistic effect of the combined materials is evidenced particularly in the behavior of the polymer, protected in accordance with the invention, upon extended heat aging.

While it is not desired to limit the invention to any particular theory of operation, we have done certain experiments and made certain observations which we believe may serve to demonstrate the principle underlying the operation of the invention. It should first be explained that SBR and other polymers as conventionally prepared ordinarily contain small amounts of metallic salts, such as iron salts, either as trace impurities introduced with the raw materials or picked up from the polymerizing equipment, or in some cases iron salts may be introduced deliberately as part of the polymerization catalyst system. It is also a frequent conventional practice to use a dialkyldithiocarbamate, such as sodium dimethyldithiocarbamate, as a short stop to halt the polymerization, and small amounts of such dithiocarbamate are found in the finished polymer. It will therefore be appreciated that there is an opportunity for an iron dialkyldithiocarbamate salt to form in the polymer. We have observed that such salt in the reduced state, that is, ferrous dimethyldithiocarbamate, has very little color, whereas in the oxidized state, in the form of ferric dimethyldithiocarbamate it is an intensely colored material, ranging from purple to black in color. We have further determined that such dark colored salt appears to become solubilized in the polymer by the action of an organic phosphite or phosphate. We therefore therorize that the reason for the development of purple spots, especially at areas where air has been included, in bales of SBR stabilized with organic phosphite after a period of storage may be due to the oxidation within the polymer of ferrous dimethyldithiocarbamate to ferric dimethyldithiocarbamate, which is solubilized or diffused within the polymer by the action of the organic phosphite (or the corresponding organic phosphate which apparently forms as the stabilizer performs its function).

Thus, we have demonstrated that if SBR is allowed to stand in benzene in contact with aqueous ferrous sulfate and sodium dimethyldithiocarbamate, exposed to air, there develops at the benzene interface an intense purple color, characteristic of the presence of the ferric salt of dimethyldithiocarbamic acid. However, the SBR itself is not discolored. Now if triphenyl phosphate is present in addition, the SBR becomes purple throughout, indicating that the phosphate has solubilized the ordinarily insoluble ferric salt and allowed it to diffuse into the polymer.

In one experiment we mixed a solution of one gram of $FeSO_4 \cdot 7H_2O$ (in 50 ml. of water) in the presence of 50 ml. of benzene with one gram of sodium dimethyldithiocarbamate, producing a yellowish precipitate of ferrous dimethyldithiocarbamate. In the presence of air this precipitate oxidized to ferric dimethyldithiocarbamate which was strongly colored dark purple. A small portion of this dark precipitate was added to 10 ml. of benzene containing 0.5 gram of triphenyl phosphite. A benzene swollen sample of colorless SBR was added to the solution thus formed, and allowed to stand at room temperature for 72 hours. It was observed that the polymer became heavily discolored, a deep purple color throughout.

We believe that the above referred to difficulty with development of purple spots in SBR stabilized with organic phosphites may thus be due to the formation of colored, oxidized metal salts which are solubilized by the organic phosphite (or the organic phosphate formed therefrom). This theory is consistent with the fact that the organic phosphite stabilizers apparently are not true antioxidants in the usual sense (that is, they are incapable of reacting with elemental oxygen), and therefore they are apparently not capable of retaining the metallic salts in their reduced, almost colorless state. Instead, the organic phosphite stabilizers evidently function essentially as reducing agents, capable of destroying hydroperoxides, and thus preventing oxidative carbon-carbon scission of the polymer chain (see "Synthetic Rubber," by Whitby, page 533, Hydroperoxides; Theory of Oxidation).

The organic phosphite stabilizers therefore not only do not prevent the formation of highly colored oxidized salts, but they actually solubilize such salts and aid in their diffusion. These salts are undesirable not only because of their color, but these salts in turn can in fact act as pro-oxidants for the oxidative degradation of the polymer.

If, in the previously described experiments in which color was developed by air oxidation of a benzene solution of ferrous sulfate and sodium dimethyldithiocarbamate, we add 0.5 gram of a phenolic antioxidant ("Wingstay-S," a styrenated phenol), it is observed that intense coloration is no longer developed. It appears that the antioxidant material, by holding the metal salt in the lower state of oxidation, substantially prevents the development of the highly colored salt. Not only does this prevent darkening of the polymer by reason of the color of the salt per se, but this also avoids the catalysis of the degradation of the polymer, such as would be brought about by the solubilized, oxidized metal salt. The phenolic antioxidant thus serves not only as an antioxidant to protect the polymer itself against oxidation, but it also serves as an antioxidant for the metal contaminants, keeping them in their relatively innocuous reduced state. We believe that this is at least in part an explanation of the unique cooperation between the organic phosphite stabilizer and the phenolic antioxidant, as employed in the invention, with unprecedented benefits in the form of greatly increased resistance to severely deteriorating influences, over a comparatively prolonged period of time.

Although we have explained the theory of operation of the invention with particular reference to polymer containing a dialkyldithiocarbamate short stop, it will be understood that the invention is also useful in polymers which do not contain dialkyldithiocarbamates. For example, the polymer may be short stopped with sodium hydrosulfite or other suitable conventional short stopping material.

The following examples, in which all quantities are expressed by weight, will serve to illustrate the practice of the invention in more detail.

*Example 1*

This example is demonstrative of the protection afforded to a polymer by the invention, from degradative effects of light and air. The polymer employed was a commercial SBR containing about 23% styrene and having a Mooney viscosity of about 48 (ML-4 at 212° F.). Sodium dimethyldithiocarbamate had been used as a short stop in preparing the polymer and the polymer also contained a trace of iron as an impurity. The polymer contained 1.25 parts, per 100 parts by weight of rubber hydrocarbon, of monononylphenyl dioctylphenyl phosphite. For 200 gram samples of such polymer were admixed on a mill with varying portions of a commercial styrenated phenol antioxidant ("Wing-Stay S") as follows.

| Sample: | Parts phenolic antioxidant per 100 parts by weight of rubber hydrocarbon |
|---|---|
| A | 1 0 |
| B | 0.1 |
| C | 0.2 |
| D | 0.3 |

[1] Control.

The samples so prepared were divided into two parts. One part was exposed to an ultra-violet light lamp for 24 hours for an accelerated test. The other part was exposed to sunlight for two weeks.

Physical examination of the portions exposed to the accelerated condition revealed that sample B, containing 0.1 part of the phenolic antioxidant, displayed very little resinification, whereas the control sample A containing no phenolic antioxidant was highly resinified as evidenced by hard and shiny appearance of the surface, as well as darkening of the color. Sample D, containing 0.3 part of the phenolic antioxidant, showed no appreciable improvement over the control, while sample C, containing 0.2 part, showed improvement but was not as good as sample B. The same order held true for the samples exposed to sunlight. This series demonstrates an important and unexpected feature of the invention, which resides in the fact that for optimum results it is necessary to employ a carefully limited quantity of the phenolic antioxidant, that is, the amount of phenolic antioxidant should be quite small in comparison to the amount of organic phosphite stabilizer present. The optimum results are obtained by using about 0.15 part of the phenolic antioxidant, along with the phosphite stabilizer.

*Example II*

This example does not illustrate the practice of the invention, but demonstrates the unsatisfactory results obtained if the phenolic antioxidant is employed without the organic phosphite stabilizer. Two samples of SBR [23% styrene, Mooney viscosity 50 (ML-4 at 212° F.)] were prepared, one containing 0.15 part of styrenated phenol antioxidant per 100 parts of rubber hydrocarbon, and the other containing 1.0 part of styrenated phenol. After 8 hours of heating at 70° C. the sample containing 0.15 part of antioxidant had resinified. The sample containing 1.0 part of antioxidant was somewhat better from the standpoint of resinification, but had poor light stability and poor resistance to extended heat aging. In view of the failure of the phenolic antioxidant alone, whether in small amount or in larger amount, to provide adequate protection, it was particularly surprising to discover the remarkable benefits to be derived from the use of phenolic antioxidant in combination with the organic phosphite stabilizer.

*Example III*

The polymer used in this example was SBR containing 23% styrene and having a Mooney viscosity of 50 (ML-4 at 212° F.). Sodium dimethyldiethiocarbamate had been used as a shortstop in the preparation of the polymer, and iron was present as an impurity. Three samples were prepared. One sample, representing the practice of the invention, contained 1 part, per 100 parts by weight of rubber hydrocarbon, of a mixture of 0.85 part of monononylphenyl dioctylphenyl phosphite as a stabilizer, and 0.15 part of dinonylated paracresol as in antioxidant. A second sample contained 1 part of monononylphenyl dioctylphenyl phosphite alone, while a third sample contained 1 part of dinonylated para-cresol alone. The second and third samples did not represent the practice of the invention, but were included simply as controls to demonstrate the superiority of the invention. All three samples were heated in air for 90 hours at 90° C. The sample containing the mixed phosphite stabilizer and phenolic antioxidant in accordance with the invention remained in very good condition, showing only the slightest trace of discoloration. On the other hand, neither of the other two samples were in satisfactory condition. The sample containing only the phosphite stabilizer was resinified and had a golden yellow color. The sample containing the phenolic antioxidant alone displayed an unsatisfactory yellowish brown color.

The foregoing examples may be repeated, using other diene polymers including polybutadiene, polyisoprene, butadiene-vinylpyridine copolymer or butadiene-acrylonitrile copolymer with equivalent results.

Any of the phosphite stabilizers mentioned above, or mentioned in the reference given above, may be substituted directly in the working examples with substantially equivalent results. Likewise, any of the phenolic antioxidants mentioned above, or mentioned in the references given above, may be substituted directly in the working examples with equivalent results. Thus, in Example III above for instance we may substitute an aryl substituted phenol such as para-phenylphenol, an aralkyl-substituted phenol such as styrenated phenol, an alkylene bis(polyalkyl phenol) such as 2,2'-methylene bis(4-methyl-6-tertiarybutylphenol), a thio bis(polyalkyl phenol) such as 4,4'-thio bis (3-methyl-6-tertiarybutylphenol), or an aryl ether of hydroquinone such as monobenzyl ether of hydroquinone, with equivalent results.

The invention makes it possible to provide stabilized polymer which is not undesirably light-sensitive. Thus, where it was formerly a practice to wrap bales of polymer, stabilized with organic phosphite, in an opaque wrapping such as opaque polyethylene, to forestall the formation of purple spots, it is now possible, using the improved polymer of the invention containing both an organic phosphite stabilizer and a phenolic type antioxidant, to ship and store polymer wrapped with transparent or translucent wrapping, without encountering development of purple spots, even after a prolonged period of time.

Similarly, whereas fire had been a serious hazard during the drying of polymers, particularly SBR containing 1–5% of divinyl benzene, even when an organic phosphite stabilizer was present, such hazard has now been minimized by the employment of the phenolic antioxidant along with the phosphite stabilizer, as described.

Having thus described our invention, what we claim and desire to protect by Letters Patent is:

1. An unvulcanized rubbery polymer selected from the group consisting of a homopolymer of a conjugated 1,3-diene and a copolymer of said diene with up to 50% by weight of a copolymerizable monomer, protected against deterioration by light, heat and air by an organic phosphite stabilizer selected from the group consisting of aryl phosphites and alkylaryl phosphites and a phenolic antioxidant selected from the group consisting of aryl-substituted phenols, aralkyl-substituted phenols, alkylene bis(polyalkyl phenols), thio bis(polyalkyl phenols), polyalkyl-substituted phenols, and aryl ethers of hydroquinone, the said organic phosphite stabilizer plus phenolic antioxidant amounting to from 0.5 to 4 parts by weight per 100 parts by weight of said polymer, and the said phenolic antioxidant being present in amount of from 0.0163 to 0.19 part by weight per one part by weight of phosphite stabilizer, the said rubbery polymer being the sole polymer present, and being in a dry, solid state.

2. An unvulcanized rubbery polymer selected from the group consisting of a homopolymer of a conjugated 1,3-diene and a copolymer of said diene with up to 50% by weight of a copolymerizable monomer, the said polymer containing iron as an impurity and sodium dialkyldithiocarbamate as a short stop, protected against deterioration by light, heat and air by an organic phosphite stabilizer selected from the group consisting of aryl phosphites and alkylaryl phosphites and a phenolic antioxidant selected from the group consisting of aryl-substituted phenols, aralkyl-substituted phenols, alykylene bis(polyalkyl phenols), thio bis(polyalkyl phenols), polyalkyl-substituted phenols, and aryl ethers of hydroquinone, the said organic phosphite stabilizer plus phenolic antioxidant amounting to from 0.5 to 4 parts by weight per 100 parts by weight of said polymer, and the said phenolic antioxidant being present in amount of from 0.0163 to 0.19 part by weight per one part by weight of phosphite stabilizer, the said phenolic antioxidant serving to prevent the development of purple coloration in the polymer that would ordinarily take place in the absence of said phenolic antioxidant as a consequence of air oxidation of ferrous dialkyldithiocarbamate present in the polymer to highly colored ferric dialkyldithiocarbamate and as a consequence of solubilization of said ferric salt in the polymer by the action of said phosphite stabilizer, the said rubbery polymer being the sole polymer present and being in a dry, solid state.

3. An unvulcanized rubbery copolymer of butadiene with up to 50% by weight of styrene containing iron as an impurity and sodium dialkyldithiocarbamate as a short stop, protected against deterioration by light, heat and air by an organic phosphite stabilizer selected from the group consisting of aryl phosphites and alkylaryl phosphites and a phenolic antioxidant selected from the group consisting of aryl-substituted phenols, aralkyl-substituted phenols, alkylene bis(polyalkyl phenols), thio bis(polyalkyl phenols), polyalkyl-substituted phenols, and aryl ethers of hydroquinone, the said organic phosphite stabilizer plus phenolic antioxidant amounting to from 0.5 to 4 parts by weight per 100 parts by weight of said polymer, and the said phenolic antioxidant being present in amount of from 0.0163 to 0.19 part by weight per one part by weight of phosphite stabilizer, the said phenolic antioxidant serving to prevent the development of purple coloration in the polymer that would ordinarily take place in the absence of said phenolic antioxidant as a consequence of air oxidation of ferrous dialkyldithiocarbamate present in the polymer to highly colored ferric dialkyldithiocarbamate and as a consequence of solubilization of said ferric salt in the polymer by the action of said phosphite stabilizer, the said rubbery copolymer being the sole polymer present and being in a dry, solid state.

4. A copolymer as in claim 3 in which the said phosphite stabilizer is triphenyl phosphite.

5. A copolymer as in claim 3 in which the said phosphite stabilizer is mononoylphenyl dioctylphenyl phosphite.

6. A copolymer as in claim 3 in which the said phosphite stabilizer is mononoylphenyl dioctylphenyl phosphite present in amount of from about 0.8 to 2.0 parts by weight, and the said phenolic antioxidant is styrenated phenol present in amount from about 0.015 to 0.25 part by weight, per 100 parts by weight of said copolymer.

7. A copolymer as in claim 3 in which the said phosphite stabilizer is mononoylphenyl dioctylphenyl phosphite present in amount of from about 0.8 to 2.0 parts by weight, and the said phenolic antioxidant is dinonylated para-cresol present in amount from about 0.015 to 0.25 part by weight, per 100 parts by weight of said copolymer.

8. A method of protecting an unvulcanized rubbery copolymer of butadiene with up to 50% by weight of styrene containing iron as an impurity and sodium dialkyldithiocarbamate as a short stop against deterioration by light, heat and air comprising incorporating therein from about 0.8 to 2.0 parts by weight of an organic phosphite stabilizer selected from the group consisting of aryl phosphites and alkylaryl phosphites and from about 0.015 to 0.25 part by weight of a phenolic antioxidant selected from the group consisting of aryl-substituted phenols, aralkyl-substituted phenols, alkylene bis(polyalkyl phenols), thio bis(polyalkyl phenols), polyalkyl-substituted phenols, and aryl ethers of hydroquinone, per 100 parts by weight of said copolymer, the said phenolic antioxidant serving to prevent the development of purple coloration in the copolymer that would ordinarily take place in the absence of said phenolic antioxidant as a consequence of air oxidation of ferrous dialkyldithiocarbamate present in the copolymer to highly colored ferric dialkyldithiocarbamate and as a consequence of solubilization of said ferric salt in the copolymer by the action of said phosphite stabilizer, the said rubbery copolymer being the sole polymer present and being in a dry, solid state.

References Cited in the file of this patent

UNITED STATES PATENTS

| | | |
|---|---|---|
| 2,726,226 | Werkheiser | Dec. 6, 1955 |
| 2,889,295 | Darby et al. | June 2, 1959 |